US011831714B2

(12) United States Patent
Narayanam et al.

(10) Patent No.: US 11,831,714 B2
(45) Date of Patent: Nov. 28, 2023

(54) PROGRAMMATICALLY MAPPING WORKLOADS TO NETWORKED OBJECT STORAGE

(71) Applicant: International Business Machines Corporation, Armonk, NY (US)

(72) Inventors: Krishnasuri Narayanam, Bangalore (IN); Phani Kumar V. U. Ayyagari, Hyderabad (IN); Rahul Rahul, New Delhi (IN); Subhojit Roy, Pune (IN); Sasikanth Eda, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/655,018

(22) Filed: Mar. 16, 2022

(65) Prior Publication Data

US 2023/0300193 A1 Sep. 21, 2023

(51) Int. Cl.
*H04L 67/1097* (2022.01)
*H04L 67/561* (2022.01)

(52) U.S. Cl.
CPC ........ *H04L 67/1097* (2013.01); *H04L 67/561* (2022.05)

(58) Field of Classification Search
CPC .......................... H04L 67/1097; H04L 67/561
See application file for complete search history.

(56) References Cited

U.S. PATENT DOCUMENTS

| | | | |
|---|---|---|---|
| 7,962,600 B2 | 6/2011 | Mdwans | |
| 10,116,329 B1* | 10/2018 | Bigman | G06F 3/0608 |
| 10,210,167 B1* | 2/2019 | Sorenson, III | H04L 67/568 |
| 10,353,634 B1* | 7/2019 | Greenwood | G06F 3/0665 |
| 10,649,682 B1* | 5/2020 | Chinthekindi | G06F 3/0643 |
| 10,983,961 B2 | 4/2021 | Manville | |

(Continued)

OTHER PUBLICATIONS

"Concepts, Planning, and Installation Guide", IBM Spectrum Scale 5.0.5, @ Copyright International Business Machines Corporation 2015, 2021, Mar. 4, 2020, Downloaded from the Internet on Oct. 20, 2021, 634 pgs., <https://www.ibm.com/docs/pl/STXKQY_5.0.5/com.ibm.spectrum.scale.v5r05.doc/pdf/scale_ins.pdf?view=kc>.

(Continued)

*Primary Examiner* — Viet D Vu
(74) *Attorney, Agent, or Firm* — David B. Woycechowsky

(57) ABSTRACT

Disclosed are techniques for programmatically mapping workloads for storage in different classes of a networked computer data storage environment, using a set of rules or data storage hints and properties of the workloads themselves. With the set of data storage hints, metadata sets are assigned to files of the incoming workloads to the networked computer data storage environment based on the properties of the workloads. Then, a target storage class is determined for each file of the workload from the plurality of storage classes present in the networked computer data storage environment. The workload files are then mapped to a logical bucket that is associated with the plurality of storage classes through a shared namespace, with the assigned metadata set for a file cueing the filesystem modules as to which storage class within the logical bucket to direct the various files of the workload to.

1 Claim, 6 Drawing Sheets

(56) References Cited

U.S. PATENT DOCUMENTS

| | | | |
|---|---|---|---|
| 2005/0021915 A1* | 1/2005 | Lowe | G06F 3/0605 |
| | | | 711/170 |
| 2010/0070543 A1* | 3/2010 | Backa | G06F 16/217 |
| | | | 711/E12.001 |
| 2012/0303686 A1 | 11/2012 | Ananthanarayanan | |
| 2016/0048551 A1 | 2/2016 | Baldwin | |
| 2016/0246676 A1* | 8/2016 | Bakre | G06F 11/2094 |
| 2018/0232395 A1* | 8/2018 | Deshmukh | G06F 3/0643 |
| 2018/0356992 A1* | 12/2018 | Lamberts | G06F 3/0658 |
| 2020/0204462 A1* | 6/2020 | Toy | H04L 41/0806 |

OTHER PUBLICATIONS

"IBM Cloud Object Storage File Access (FA), IBM Storage for Data and AI Data Sheet", Downloaded from the Internet on Oct. 20, 2021, @ Copyright IBM Corporation 2020, 7 pgs., <https://www.IBM.com/downloads/cas/MV80ZLGB>.

"IBM Spectrum Scale", IBM Spectrum Scale 5.1.0, Downloaded from the Internet on Oct. 20, 2021, 10 pgs., <https://www.ibm.com/docs/en/spectrum-scale/5.1.0>.

Ananthanarayanan, et al., "Panache: A Parallel WAN Cache for Clustered Filesystems", ACM SIGOPS Operating System Review, vol. 42, Issue 1, Jan. 2008, pp. 48-53, DOI: 10.1145/1341312.1341322.

Blas, et al., "Implementation and Evaluation of File Write-Back and Prefetching for MPI-IO over GPFS", The International Journal of High Performance Computing Applications 2010; 24(1), 78-92, Jan. 8, 2010, 13 pgs., doi:10.1177/1094342009359015.

Perez, et al., "Optimizations Based on Hints in a Parallel File System", ICCS 2004, LNCS 3038, @ Springer-Verlag Berlin Heidelberg 2004, 8 pgs.

* cited by examiner

PROGRAMMATICALLY MAPPING WORKLOADS TO NETWORKED OBJECT STORAGE

BACKGROUND

The present invention relates generally to the field of data caching in cloud computing environments, and more particularly to management of data caching in a multi-cloud environment.

In computing, a file system or filesystem (sometimes abbreviated to fs) is a method and data structure that the operating system uses to manage how data is stored and retrieved. Without a file system, data placed in a storage medium would be one large body of data with identification of where one piece of data stopped and the next began, or where any piece of data was located when retrieving it. By separating the data into pieces and providing each piece a name, the data is readily isolated and identified. Borrowing its name from the way a paper-based data management system is named, each group of data is referred to as a "file." The structure and logic rules used to control the groups of data and their names is referred to as a "file system." Filesystems come in many types. Each one differs in structure and logic, as well as properties of speed, flexibility, security, size and others. Some file systems are designed to be used for specific applications.

In computing, a namespace describes a set of signs (names) that are used to identify and refer to objects of various kinds. A namespace is a technique to ensure that all of a given set of objects have unique names such that they can be easily identified. Namespaces are frequently structured as hierarchies to enable reuse of names in different contexts. A prominent example for namespaces is filesystems, which assign names to files. Some programming languages organize their subroutines and variables using namespaces. Distributed systems and computer networks use a namespace to assign names to resources, such as computers, printers, websites, and remote files. Operating systems can use isolated namespaces to partition kernel resources to support virtualization containers. In a similar use case, hierarchical file systems organize files in directories, where every directory is a separate namespace, such that the directories "employees" and "customers" may both contain a file named "john_smith".

Cloud computing describes the on-demand availability of computer system resources, particularly data storage (cloud storage) and computing power, where the user does not have direct active management. Large clouds commonly have functions distributed over multiple locations, where each location is typically a data center. Cloud computing is reliant upon sharing of resources to achieve coherence and economies of scale, commonly using a "pay-as-you-go" model which can help in reducing initial capital expenses but may also lead to unexpected operating expenses for unaware users.

Multicloud (also spelled multi-cloud or multi cloud) describes the usage of multiple cloud computing and storage services within one heterogeneous architecture. Multi-cloud also describes the distribution of cloud assets, software, applications, etc. across multiple cloud-hosting environments. With a typical multi-cloud architecture utilizing two or more public clouds as well as multiple private clouds, A multi-cloud environment aims to eliminate the reliance on any single cloud provider, with common multi-cloud architectures using two or more public clouds along with multiple private clouds. Multi-cloud is different from hybrid cloud in that it refers to multiple cloud services instead of multiple deployment modes (public, private, legacy). Also, in a multi-cloud environment, it is not essential to have synchronization between different vendors to complete a computation process, unlike parallel computing or distributed computing environments.

SUMMARY

According to an aspect of the present invention, there is a method, computer program product and/or system that performs the following operations (not necessarily in the following order): (i) receiving a set of storage hints corresponding to a plurality of rules for modifying which networked storage features of a networked data storage environment are enabled for a given workload based on properties of the given workload, where the networked data storage environment has a plurality of storage classes mapped to a logical bucket in a common namespace; (ii) receiving a target workload corresponding to data for filesystem operations in the common namespace of the networked data storage environment; (iii) assigning a set of metadata to the target workload based, at least in part, on application of the set of storage hints to properties of the target workload and the plurality of storage classes; and (iv) determining a target storage class for the target workload based, at least in part, on the set of metadata.

DETAILED DESCRIPTION

Figure 1:
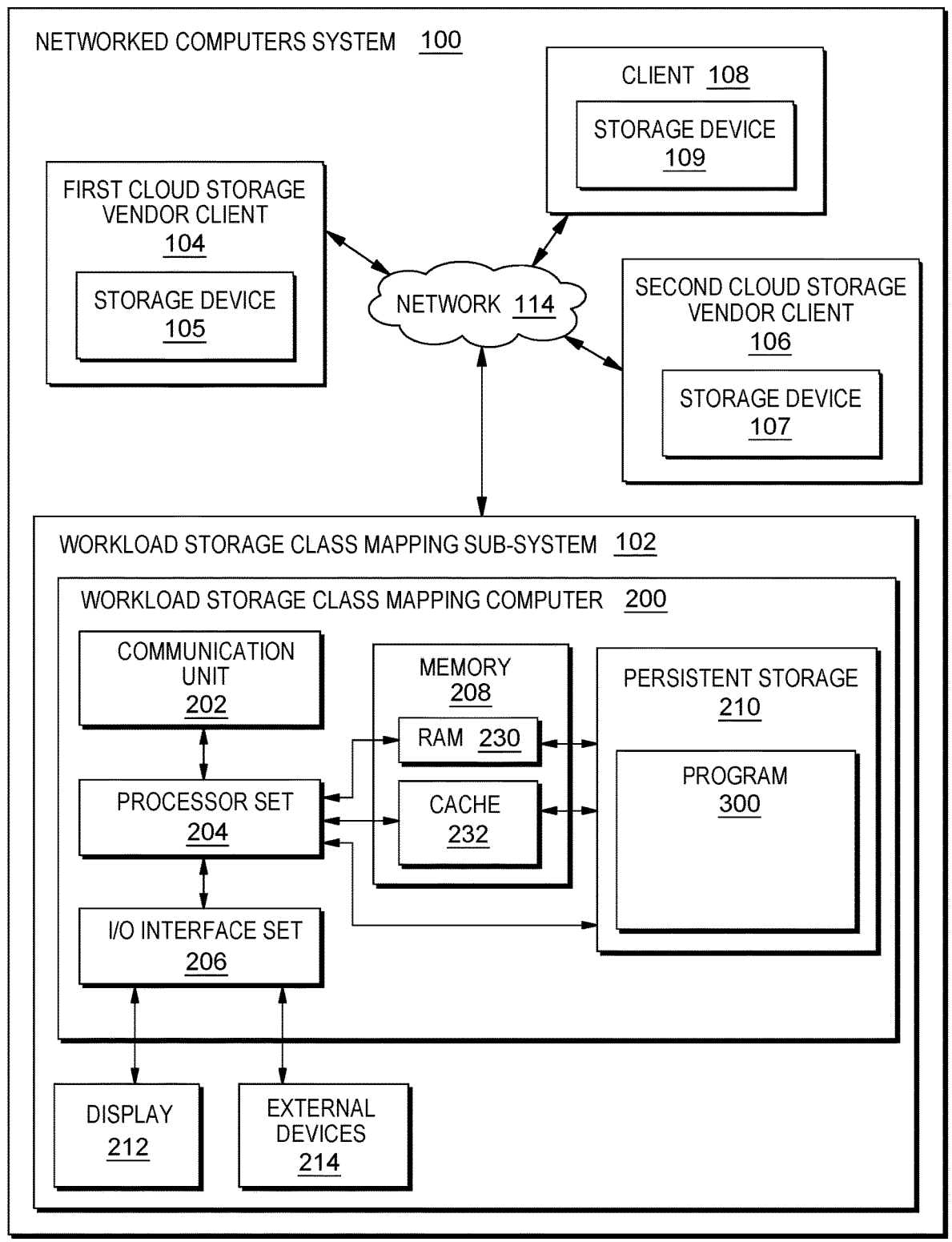
FIG. 1 is a block diagram view of a first embodiment of a system according to the present invention.

Some embodiments of the present invention are directed to techniques for programmatically mapping workloads for storage in different classes of a networked computer data storage environment, using a set of rules or data storage hints and properties of the workloads themselves. With the set of data storage hints, metadata sets are assigned to files of the incoming workloads to the networked computer data storage environment based on the properties of the workloads. Then, a target storage class is determined for each file of the workload from the plurality of storage classes present in the networked computer data storage environment. The workload files are then mapped to a logical bucket that is associated with the plurality of storage classes through a shared namespace, with the assigned metadata set for a file cueing the filesystem modules as to which storage class within the logical bucket to direct the various files of the workload to.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium (sometimes referred to as "machine readable storage medium") can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention, described in detail with reference to the Figures. Networked computers system 100 includes: workload storage class mapping subsystem 102 (sometimes herein referred to, more simply, as subsystem 102); first cloud storage vendor client 104; second cloud storage vendor client 106; client subsystem 108; and communication network 114. Subsystem 102 includes: workload storage class computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with workload storage class computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

First cloud storage vendor client 104 is a cloud storage computing environment corresponding to a first cloud computing vendor, having a storage device 105 corresponding to a machine readable storage device. Storage device 105 may be any type of known machine readable storage configuration.

Second cloud storage vendor client 106 is a cloud storage computing environment corresponding to a second cloud computing vendor, having a storage device 106 corresponding to a machine readable storage device. Storage device 106 may be any type of known machine readable storage configuration.

Client 108 further includes storage device 109, a machine readable storage device which may be any type of known machine readable storage configuration.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
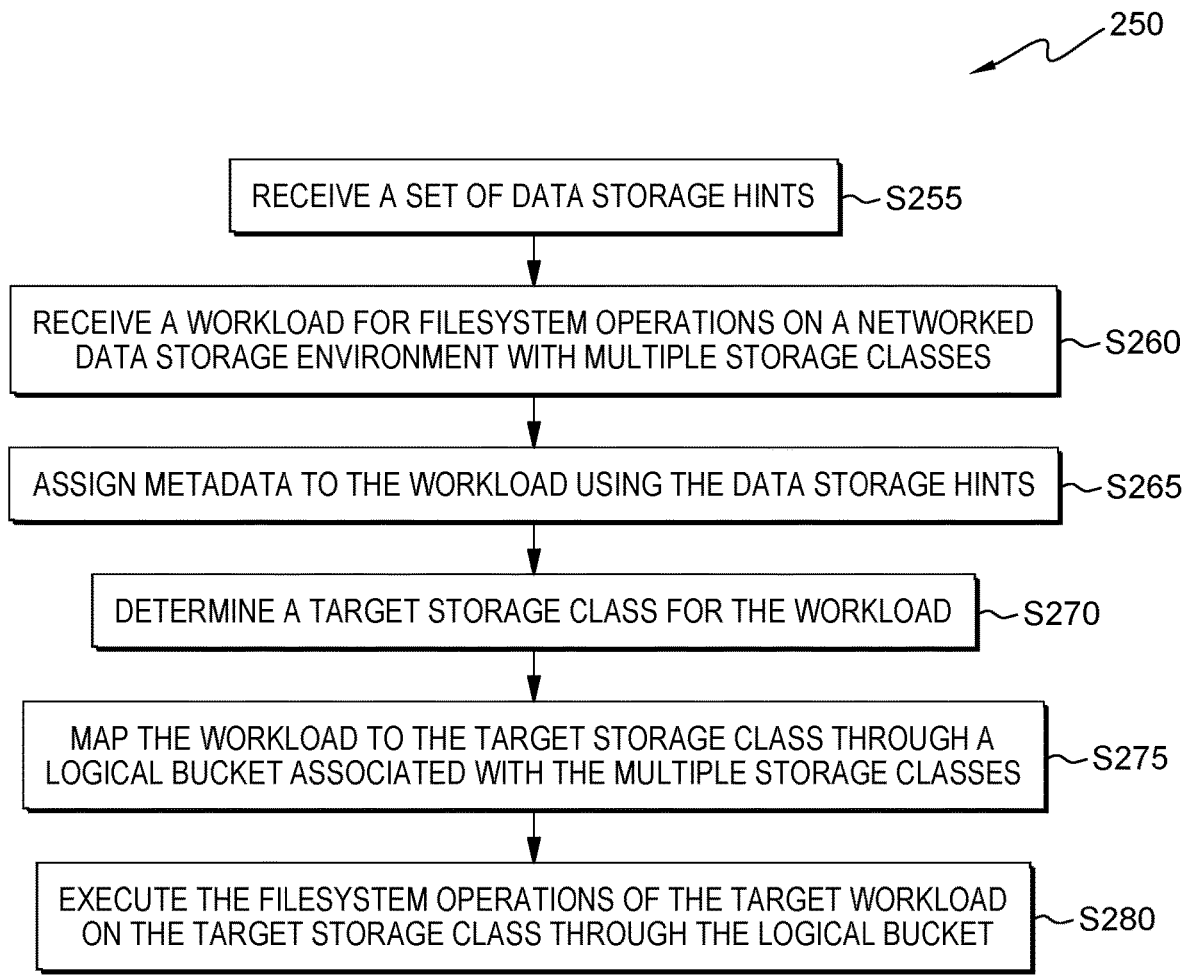
FIG. 2 is a flowchart showing a first embodiment method performed, at least in part, by the first embodiment system.
Figure 3:
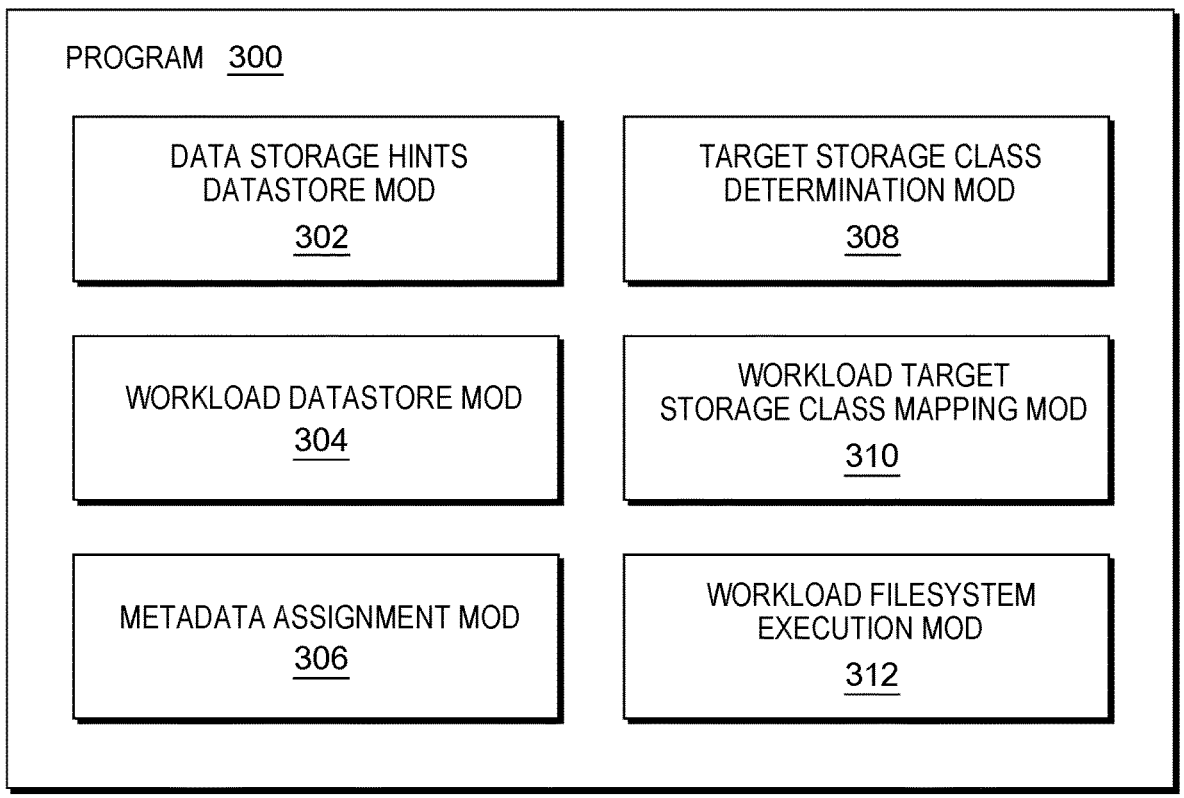
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where data storage hints datastore module ("mod") 302 receives a set of data storage hints. In this simplified embodiment, the set of data storage hints is a set of rules that dictate networked data storage features are to be applied to a given workload based on which rules the workload matches the criteria for. For example, in this simplified embodiment the set of rules includes the following: (i) rule 1—if the file name begins with "tmp", disable replication of the file to networked data storage; and (ii) rule 2—if the file size is less than 1 gigabyte of data, disable compression of the file.

Processing proceeds to operation S260, where workload datastore mod 304 receives a workload for filesystem operations on a networked data storage environment with multiple storage classes. In this simplified embodiment, the workload corresponds to the training of a machine learning model comprising a neural network for generating an image of an object from a set of descriptive words. This workload includes the following files: (i) the training dataset including a plurality of text files with a list of descriptive words; (ii) training labels including images which correspond to the plurality of text files; (iii) the neural network; (iv) result labels corresponding to results generated by the neural network upon inputting the training dataset; and (v) evaluation sets corresponding to comparisons between the generated result labels and the training labels. The filesystem operations for this workload involve writing and deleting several files throughout processing of the workload, including: (i) generating results from the neural network processing the training dataset; (ii) generating an evaluation set corresponding to a comparison to the generated results and the training labels; (iii) generating an updated neural network based on the evaluation set, modifying how the neural network processes input data to generate different results.

The processes of the workload are repeatedly performed until the results generated from the neural network upon the training dataset reach a threshold level of similarity to the training labels. Until this is achieved, the workload names certain files generated by the neural network with a tmp tag (short for temporary) in the file name to indicate that the files are temporary and are intended to be overwritten in subsequent iterations, including: (i) the generated results from the neural network processing the training dataset, named "tmp_results.file"; (ii) the generated evaluation set corresponding to a comparison to the generated results and the training labels, named "tmp_evaluation.file"; and (iii) the generated updated neural network, named "tmp_neuralNetwork.exe". In contrast, the training dataset and the training labels, which are reused for each iteration of the neural network as it performs the self-learning process, are not marked with a tmp tag. When a new version of the neural network is generated, for example, the previous version is deleted while the new version is written. The same is true for the generated results and generated evaluations, which are similarly deleted and written.

The networked data storage environment is a multi-cloud data storage environment configured as a unified interface for three different storage classes. The first storage class corresponds to a first cloud storage vendor and is hosted on first cloud storage vendor client 104 of FIG. 1. The first storage class is configured for high performance data storage operations, with economic impact for compression and decompression operations. The second storage class corresponds to a second cloud storage vendor and is hosted on second cloud storage vendor client 106. The second storage class is configured for cost efficient storage of large amounts of data, with relatively affordable economic impact for using compression and decompression operations. The third storage class corresponds to on premises, or "on-prem" data storage and is hosted on client 108, a computing cluster operated and controlled by the organization which generated the workload.

Processing proceeds to operation S265, where metadata assignment mod assigns metadata to the workload using the data storage hints. In this simplified embodiment, a set of metadata is assigned to each file individually, with the set of metadata including what data storage hints are applicable to a given file. Specifically, in this simplified embodiment, a set of metadata includes two boolean entries: (i) rule 1; and (ii) rule 2. Each entry may have a value of "T" for true, indicating that the rule is applicable to the file, or "F" for false, indicating that the rule does not apply to the file. For example, in this simplified embodiment, sets of metadata are assigned to each of the following files for the workload: (i) the training dataset including a plurality of text files with a list of descriptive words; (ii) training labels including images which correspond to the plurality of text files; (iii) the neural network; (iv) result labels corresponding to results generated by the neural network upon inputting the training dataset; and (v) evaluation sets corresponding to comparisons between the generated result labels and the training labels.

For the training dataset, none of the files begin with the name "tmp", so the metadata entry for rule 1 in the metadata set for the training dataset is set to a value of "F". Additionally, as a plurality of text files, the file size for the training dataset is less than 1 gigabyte, resulting in the metadata entry for rule 2 in the metadata set for the training dataset having a value of "T" assigned as well. For the training labels, none of the files begin with the name "tmp", so the metadata entry for rule 1 in the metadata set for the training labels is set to a value of "F". Additionally, as a set of images corresponding to the text files in the training dataset, the file size for the files in the training labels is greater than 1 gigabyte, resulting in a value of "F" assigned to the metadata entry for rule 2 in the metadata set for the training labels files. For the neural network, each iteration of the neural network is named "tmp_neuralNetwork.exe", so the metadata entry for rule 1 in the metadata set for the neural network is set to a value of "T". Additionally, the file size for any given iteration of the neural network is less than 1 gigabyte, resulting in a value of "T" assigned to the metadata entry for rule 2 in the metadata set for the neural network files. For the result labels, each file corresponding to the result labels is named "tmp_results.file" as a set of results generated from an iteration of the neural network, so the metadata entry for rule 1 in the metadata set for the result labels is set to a value of "T". Additionally, as the result labels are a set of images generated to correspond to the text files in the training dataset, the file size for the files in the result labels is greater than 1 gigabyte, resulting in a value of "F" assigned to the metadata entry for rule 2 in the metadata set for the result labels files. For the evaluation sets, each evaluation set is named "tmp_evaluation.file" and corresponds to an evaluation of the result labels generated by an iteration of the neural network, so the metadata entry for rule 1 in the metadata set for the evaluation set files is set to a value of "T". Additionally, the file size for each file corresponding to the evaluation set is less than gigabyte, resulting in a value of "T" assigned to the metadata entry for rule 2 in the metadata set for the evaluation set files.

Processing proceeds to operation S270, where target storage class determination mod 308 determines a target storage class for the workload. In this simplified embodiment, a target storage class is selected on a file-by-file basis, with each file having a separate determination for which storage class to assign the file to. Further, target storage class determination mod 308 determines a target storage class for a given file by the metadata set assigned to the file. In this simplified embodiment, if the metadata set for a file has a value of "T" for the entry corresponding to rule 1, the target storage class for the file is the third storage class. A value of "T" for the entry corresponding to rule 1 indicates that the file should not be replicated to networked data storage, which excludes the first storage class and the second storage class, but not the third storage class corresponding to on-prem storage. If the metadata set for a file has a value of "F" for the entry corresponding to rule 1 and a value of "T" for the entry corresponding to rule 2, the target storage class for the file is the first storage class. A value of "F" for the entry corresponding to rule 1 indicates that the file should be replicated to networked data storage, and a value of "T" for the entry corresponding to rule 2 indicates that the file should not be subject to compression. If the metadata set for a file has a value of "F" for the entry corresponding to rule 1 and a value of "F" for the entry corresponding to rule 2, the target storage class for the file is the second storage class. A value of "F" for the entry corresponding to rule 1 indicates that the file should be replicated to networked data storage, and a value of "F" for the entry corresponding to rule 2 indicates that the file should be subject to compression. Each storage class is associated with one or more entries and corresponding values in the metadata set.

For this simplified embodiment, based on the metadata assigned to the files of the workload at S265, target storage class determination mod 308 determines target storage classes for the files of the workload, including: (i) the training dataset including a plurality of text files with a list of descriptive words—first storage class; (ii) training labels including images which correspond to the plurality of text files—second storage class; (iii) the neural network—third storage class; (iv) result labels corresponding to results generated by the neural network upon inputting the training dataset—third storage class; and (v) evaluation sets corresponding to comparisons between the generated result labels and the training labels—third storage class.

Processing proceeds to operation S275, where workload target storage class mapping mod 310 maps the workload to the target storage class through a logical bucket associated with the multiple storage classes. In this simplified embodiment, the networked data storage environment uses a logical bucket for filesystem operations that is internally mapped to each of the three storage classes simultaneously. When a workload is sent to the networked data storage environment, the workload is sent to this logical bucket, which acts as a top-level namespace applied to each of the storage classes. Workload target storage class mapping mod 310 then maps individual files to their corresponding target storage classes within this logical bucket; only one target (the logical bucket) is needed for entities sending workloads to the networked data storage environment to enable storing individual files among the three storage classes, as appropriately determined based on properties of the files, the data storage hints, and the storage classes.

Processing proceeds to operation S280, where workload filesystem execution mod 312 executes the filesystem operations of the target workload on the target storage class through the logical bucket. In this simplified embodiment, filesystem operations for each of the files of the workload are executed on machine readable storage devices of their corresponding target storage classes, including: (i) filesystem operations for the training dataset including a plurality of text files with a list of descriptive words are executed on storage device 105 of first cloud storage vendor client 104; (ii) filesystem operations for the training labels including images which correspond to the plurality of text files are executed on storage device 107 of second cloud storage vendor client 106; (iii) filesystem operations for the neural network are executed on storage device 109 of client 108; (iv) filesystem operations for the result labels corresponding to results generated by the neural network upon inputting the training dataset are executed on storage device 109 of client 108; and (v) filesystem operations for the evaluation sets corresponding to comparisons between the generated result labels and the training labels are executed on storage device 109 of client 108.

III. Further Comments and/or Embodiments

Some embodiments of the present invention recognize the following facts, potential problems and/or potential areas for improvement with respect to the current state of the art: (i) General Parallel File System (GPFS) is a high-performance clustered file system which is highly optimized for large-chunk I/O operations with regular access patterns (contiguous or regularly strided); (ii) However, its performance for small-chunk, non-contiguous I/O operations with irregular access patterns (e.g. non-constant strides) is not sufficiently addressed; (iii) This kind of access can cause a high access contention, translated especially in a high locking overhead;

(iv) GPFS addresses this issue by a technique called data-shipping, which can be activated/deactivated through a hint of the GPFS library; (v) This technique disables client-side caching and binds each GPFS file block to a single I/O agent, which will be responsible for all accesses to this block; (vi) For write operations, each task sends the data to be written to the responsible I/O agents. I/O agents in turn issue the write calls to the end storage system; (vii) For reads, the I/O agents read the file blocks, and ship only the requested read data to the appropriate tasks; (viii) Data shipping is more efficient than the default locking approach, when fine-grained sharing is present, because the granularity of GPFS cache consistency is an entire file block, and accesses to the same block are serialized by the locking manager; (ix) GPFS recognizes sequential and simple strided file access patterns for read and write operations and performs prefetching and write-behind accordingly; (x) however, for different patterns, the default prefetching and write-behind policy may become counter productive; (xi) for these cases, the user can define customized prefetching and write-behind policies by a hint called Multiple Access Range (MAR); (xii) The MAR hint allows each process to specify at file system block granularity the file regions over which prefetching and write-behind should be performed; and (xiii) some examples of GPFS hint Descriptions includes: (a) gpfsDataShip-Start—Initiates data shipping mode for a file, (b) gpfsDataShipStop—Finalizes data shipping mode for a file, (c) gpfsMultipleAccessRange—Defines file blocks used for prefetching and write-behind, and (d) gpfsClearFileCache—Invalidates the local buffer cache.

Some embodiments of the present invention recognize the following facts, potential problems and/or potential areas for improvement with respect to the current state of the art: (i) The Active File Management (AFM) to cloud object storage is a feature that enables placement of files or objects in a cluster to a cloud object storage; (ii) It allows associating a fileset with a cloud object storage; (iii) Customers use a cloud object storage to run workloads such as mobile applications, backup and restore, enterprise applications, and big data analytics, file server; (iv) These workloads can be cached locally on fileset and on AFM to cloud object storage filesets for faster computation and synchronized back to the cloud object storage server; (v) The front-end for object applications is an AFM to cloud object storage fileset (namespace) with the data exchange between the fileset and cloud object storage buckets through the AFM to cloud object storage in the background by providing high performance for the object applications; (vi) Object applications can also span across AFM to cloud object storage filesets and on a cloud object storage; (vii) Both the fileset and the cloud object storage can be used as a backup of important data; (viii) each cache fileset in a cluster is served by one of the nodes designated as a gateway node in the cluster; (ix) The gateway node that is mapped to a fileset is called the primary gateway of the fileset; (x) The primary gateway acts as the owner of the fileset and communicates with the home cluster; (xi) All other nodes in the cluster, including other gateways, become the application nodes of the fileset; (xii) Therefore any node in the cache cluster can function as a gateway node and an application node for different filesets based on configuration of the node; (xiii) Application nodes communicate with the primary gateway for a fileset via internal network requests; and (xiv) The gateway function is highly available and can be scaled-out.

Some embodiments of the present invention recognize the following facts, potential problems and/or potential areas for improvement with respect to the current state of the art: (i) Cloud Object Storage (COS)—Cloud Storage pricing are typically based on the following components; (ii) Data storage—the amount of data stored in your buckets; (ii) Storage rates vary depending on the storage class of your data and location of buckets; (iii) Network usage—the amount of data read from or moved between your buckets; (iv) Operations usage—the actions you take in Cloud Storage, such as listing the objects in your buckets; (v) Retrieval and early deletion fees—applicable for data stored in the Near-line Storage, Cold line Storage, and Archive Storage classes; (vi) Management & Analytics—usage of analytic features such as storage lens, tagging, inventory, batch processing, insights etc.; (vii) Replication—cross region replication vs. same region replication etc.; (viii) In current scenarios, to obtain high performance, clustered filesystem cloud solutions often leverage local SSD disks which lose data upon power loss or shutdown and their efficiencies are bench-marked based on how fast or efficiently data can be pre-fetched and backed up from filesystem to object storage and vice versa; and (ix) A traditional wide area network (WAN) caching-COS implementation, involves below operations: (a) The filesystem operation (i.e. open/create( ), read( ), write( ), delete( )) is captured by the filesystem daemon stored in a queue, and (b) Based on the operation recorded in queue, the filesystem spins a thread which further performs a call to object storage (i.e. translating filesystem operation in to REST CRUD).

Figure 4:
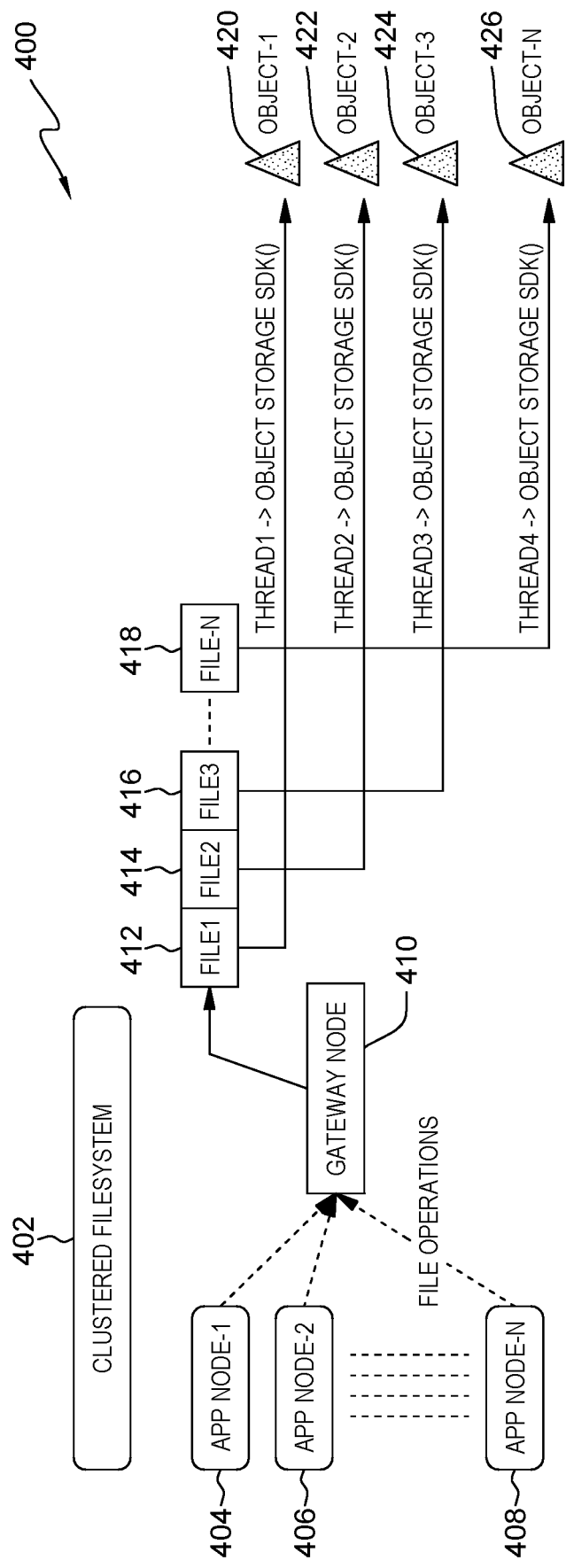
FIG. 4 is a block diagram showing a contemporary WAN caching cloud object storage implementation.

Block diagram 400 of FIG. 4 shows a state of the art WAN caching cloud object storage implementation, including: (i) clustered filesystem 402; (ii) app node-1 404; (iii) app node-2 406; (iv) app node-N 408; (v) gateway node 410; (vi) file1 412; (vii) file2 414; (viii) file3 416; (ix) file-N 418; (x) object-1 420; (xi) object-2 422; (xii) object-3 424; and (xiii) object-N 426.

Some embodiments of the present invention recognize the following facts, potential problems and/or potential areas for improvement with respect to the current state of the art: (i) While using WAN caching (AFM-COS) feature, customers can seamlessly sync their filesystem data to object storage and vice versa; (ii) Challenges in this model: (a) Traditional filesystems cannot distinguish between the data traffic (especially between data required for WAN caching and among other functions), (b) Upon a file update, an event is passed to the queue maintained for WAN caching and selective removal of a particular file from the queue cannot be performed, and (c) Along with above the current mechanisms do not consider economics of object storage during this backup/synchronization process; (iii) Below are few scenarios; (iv) in scenario one, assume a file written by application on to filesystem, traditionally its file heat determines the frequency of access and filesystem tiering places this file to a cheaper storage class; (v) The current day caching based sync architectures do not act on this file attribute and stores it in standard object class of a high costing object storage in a multi-cloud environment, whereas it is logical to store them in cold or archival storage; (vi) in scenario two, assume an AI/ML workload is running on the filesystem which produces enormous amount of temporary/intermediate result data, but the current filesystems lack the capability to distinguish between the data traffic and pushes these changes to WAN caching queue for replaying on object storage; (vii) These operations increase the frequency of round trips between the filesystem and object storage; (viii) As well if the opted object storage charges per number of requests (PUT/GET/DELETE/HEAD), which results in huge operation cost; (ix) current day filesystems do not have the programmable hints which can be used to determine if it needs to trigger a specific filesystem operation on a particular file; (x) in scenario three, assume a file written by application on to filesystem and has been synched to cloud object storage, and due to inactivity on the object it has been moved to archival storage (usually cloud administrator sets the object life cycle policies); (xi) But it has been deleted on cache (filesystem), which triggers delete on archival storage (that results in early deletion charges); (xii) The current day caching based sync architectures do not predict the life span of the file and likewise frame the lifecycle of object.; (xiii) in scenario four, assume a file written by application on to filesystem whose replication is set to '2'; (xiv) traditionally its replica count is stored in file metadata, but current caching system places this file to a cheaper storage class; and (xv) current day caching based sync architectures do not act on this file attribute and stores it in standard object class, whereas it is logical to store them in REPLICA based object storage.

Some embodiments of the present invention may include one, or more, of the following operations, features, characteristics and/or advantages: (i) a framework that acts as a middle-ware layer in a clustered filesystem which auto-determines an object storage to associate relationship with among a group of object stores in a multi-cloud environment; (ii) the association with object storage is determined based on filesystem access hints (where hints are auto programmed based on the nature of workload), cost/performance or any other custom defined profile defined by user; (iii) this framework helps in effectively using filesystem's resources (specifically WAN caching) by mapping them with multi-object storage characteristics and vice versa, which leads to reduction in application latency, IO workload, and object storage operations cost; and (iv) the framework creates a logical cloud object storage bucket as target and internally maps it with different storage class buckets along with economics created using different object storage vendors; an example logical cloud object storage bucket is as follows:

```
Ex: logical-bucket-name = 'cos-bucket-1'
{
'cos-bucket-1':
{
'bucket-1': {'vendor': 'a', 'type': 'standard'},
'bucket-2': {'vendor': 'b', 'type': 'archival'},
'bucket-3': {'vendor': 'c', 'type': 'cold'},
'bucket-4': {'vendor': 'd', 'type': 'cross-zone-replica'}
'bucket-5': {'vendor': 'on-prem', 'type': 'file_size'}
}
}
```

Some embodiments of the present invention may include one, or more, of the following operations, features, characteristics and/or advantages: (i) A programmable filesystem hints that can auto-determine the nature of I/O, workload happening in the namespace (or from user fed); (ii) These hints are further used to determine if other filesystem operations (such as snapshots, virus scan, re-stripe, replication, WAN caching, compression, deduplication, caching, cloning etc.) need to be carried on a particular file based on how read/writes/delete patterns are being performed; (iii) It also provides a flexibility to determine the trigger (such as time period or a watch on other file or event or any action etc.) to initiate a specific filesystem operation upon reaching a determined checkpoint; (iv) for example: (a) 'hint1': 'if file name is tmp.xxx then stop replication', (b) 'hint2': 'if file size is <1 GB then stop compression', (c) 'hint3': 'if file starts with a particular header type then stop WAN caching', (d) 'hint4': 'if file close happens within 1 ms then start caching', and (e) 'hint5': 'if file size is growing in x-interval then stop WAN caching'; (v) Based on the auto-configured hints and the logical bucket association, associate metadata to the files; (vi) Currently a dirty bit flag in inode is used to verify the state of file vs. object and its differences are used to prefetch, evict files from WAN caching queue; (vii) Association of logical cloud object storage bucket to WAN caching framework, where WAN caching framework along with data content also shares the metadata and appropriate object storage class depending on the economics opted; and (viii) Analytic unit in cloud, which analyses the metadata, storage class and appropriately places the data content to buckets configured with storage classes (extendable to multi-cloud scenarios).

Some embodiments of the present invention may include one, or more, of the following operations, features, characteristics and/or advantages: (i) the framework act as a middle-ware layer in a clustered filesystem which auto-determines an object storage to associate relationship with among a group of object stores in a multi-cloud environment; (ii) the association with object storage is determined based on filesystem access hints (where hints are auto programmable based on the nature of workload), cost/performance or any other custom defined profile defined by user; (iii) creating a logical cloud object storage bucket as target and internally mapping it with different storage class buckets along with economics created using different object storage vendors; (iv) having programmable filesystem hints that can auto-determine the nature of I/O, workload happening in the namespace (or from user fed) and these hints are further used to determine if other filesystem operations (such as snapshots, virus scan, re-stripe, replication, WAN caching, compression, deduplication caching, cloning etc.) needs to be carried on a particular file based on how read/writes/delete patterns are being performed; (v) a step of providing a flexibility to determine the trigger (such as time period or a watch on other file or event or any action etc.) to initiate a specific filesystem operation upon reaching a determined checkpoint; (vi) based on the auto-configured hints and the logical bucket association, associating metadata to the files; (vii) association of logical cloud object storage bucket to WAN caching framework; (viii) WAN caching framework along with data content also shares the metadata and appropriate object storage class depending on the economics opted; and (ix) having Analytic unit in cloud, which analyses the metadata, storage class and appropriately places the data content to buckets configured with storage classes.

Some embodiments of the present invention may include one, or more, of the following operations, features, characteristics and/or advantages: (i) focused on "optimizing charges incurred for delete; (ii) For example, vendor A charges 'X' if when immediately performing a delete operation on high performance object storage tier within a stipulated period of time (where the X charge is higher than actual charge of storing the object); (iii) almost all DAAA customers choose high performance object storage tier (there are various tiers in object storage: (a) std, (b) high performance, (c) balanced, (d) archival, etc.); (iv) the general expectation is high performance tier will get better disks and no network throttle which could match the filesystem performance; (v) in the absence of the present invention, AI applications continue to store their intermediary results to filesystem which is configured to tier to object storage; (vi) the Filesystem daemon has no intelligence that this file is going to be replaced in coming cycles (i.e. neural network next layer optimization), and blindly pushes it to highest performing object storage tier; (vii) in coming cycles when the object is overwritten, the filesystem performs delete operation on object storage (since there is no append) which is charged costlier than actual storing of object; (viii) In this case (we can assume a GPU direct filesystem that is also configured with AFM), aspects of the present invention identify this nature of object storage and tune the AI or GPU applications such that they choose their writes to object storage verify carefully and don't place any immediate result that is going to be deleted in later stages to tier which charges based on deletion; and (ix) It can be sort of the filesystem API that hints the AI application to use a temporary storage managed by the filesystem and once the result (or AI application determines it as stable state of the object), then only push to object storage.

Figure 5:
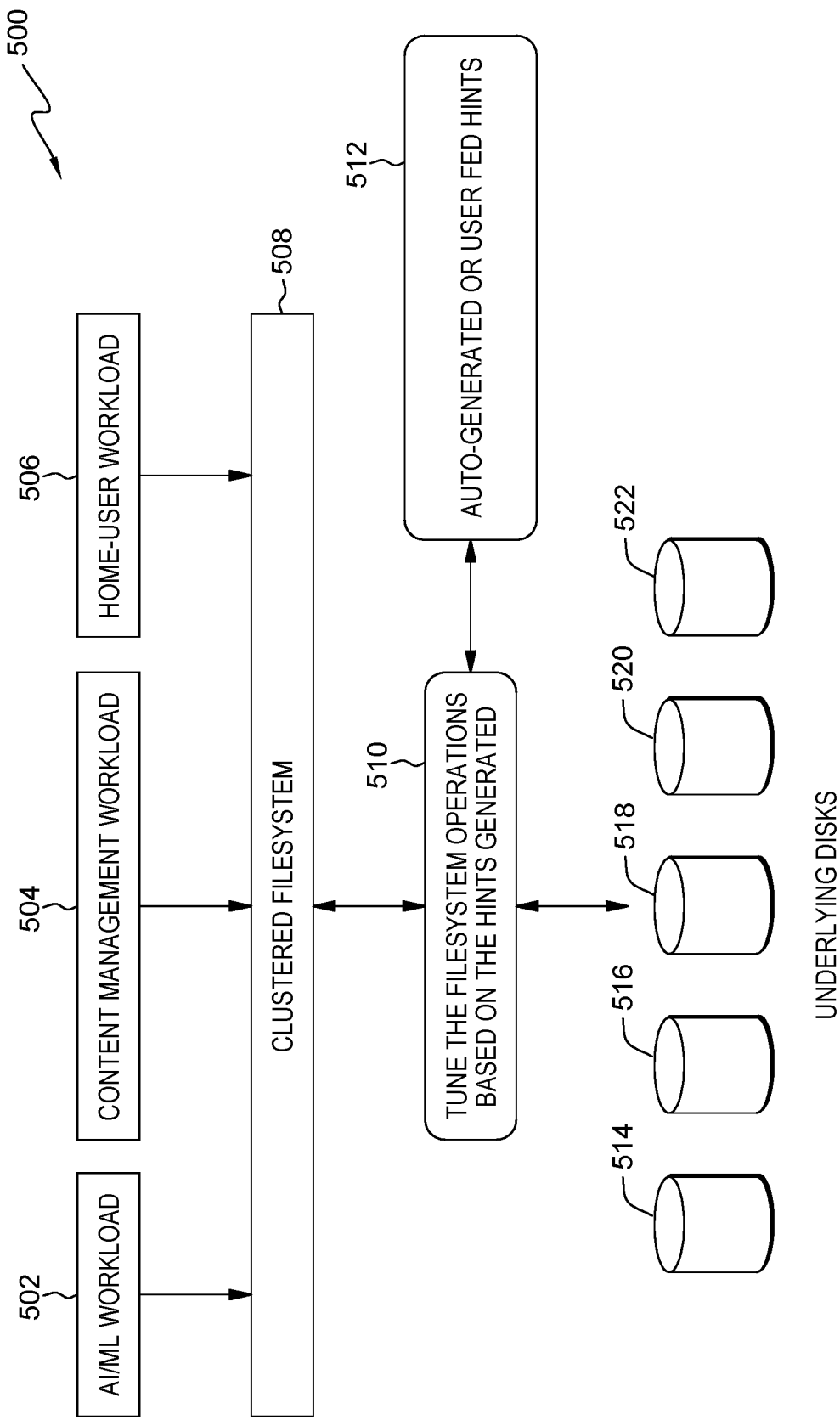
FIG. 5 is a block diagram showing a second embodiment system for programmatically managing features of networked data storage for individual workloads.
Figure 6:
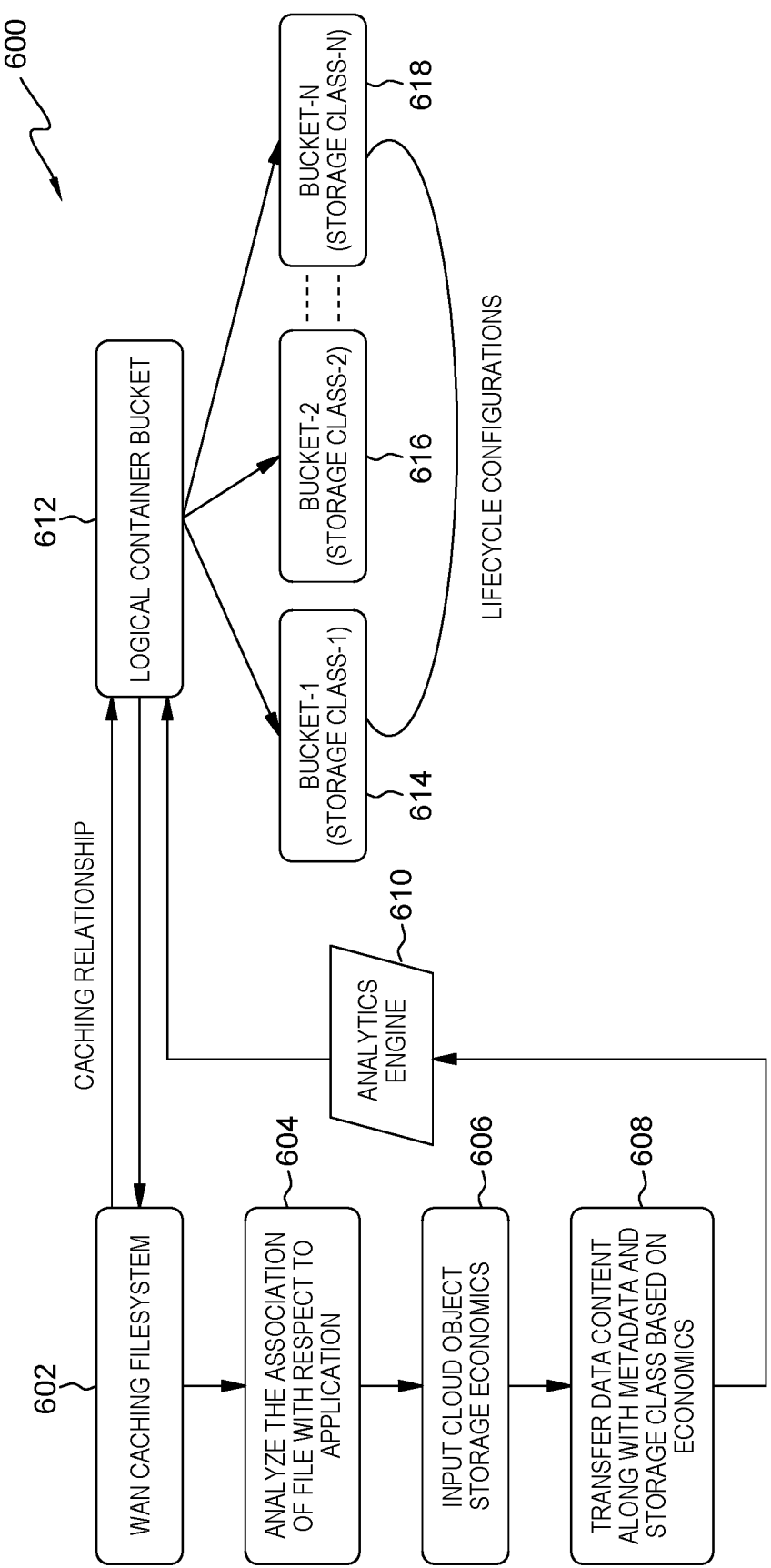
FIG. 6 is a block diagram showing a third embodiment system for programmatically mapping files of workloads to object storage classes.

Block diagram 500 of FIG. 5 shows an implementation of filesystem hints for tuning how a clustered filesystem manages specific workloads, including: (i) AI/ML workload 502; (ii) content management workload 504; (iii) home-user workload 506; (iv) clustered filesystem 508; (v) filesystem tuning module 510; (vi) filesystem hints 512; and (vii) underlying disks 514, 516, 518, 520 and 522. Some examples of filesystem hints includes: (i) hint1—if file name is tmp.xxx then stop replication; (ii) hint2—if file size is less than 1 gigabyte, then stop compression; (iii) hint3—if file starts with a particular header type, then stop WAN caching; (iv) hint4—if file close happens within 1 millisecond, then start caching; and (v) hint5—if file size is growing in x-intervals, then stop WAN caching.

Block diagram 600 of figure shows an implementation of a middleware layer for mapping files to different object stores in a multi-cloud environment, where the files are stored to appropriate object storage based on the user fed hints/cost/performance profile, including: (i) WAN caching filesystem 602; (ii) analyze the association of file with respect to application module 604; (iii) input cloud object storage economics module 606; (iv) transfer data content along with metadata and storage class based on economics module 608; (v) analytics engine 610; (vi) logical container/bucket 612; (vii) bucket-1 storage class-1 614; (viii) bucket-2 storage class-2 616; and (ix) bucket-N storage class-N 618.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

We: this document may use the word "we," and this should be generally be understood, in most instances, as a pronoun style usage representing "machine logic of a computer system," or the like; for example, "we processed the data" should be understood, unless context indicates otherwise, as "machine logic of a computer system processed the data"; unless context affirmatively indicates otherwise, "we," as used herein, is typically not a reference to any specific human individuals or, indeed, and human individuals at all (but rather a computer system).

What is claimed is:

1. A computer-implemented method (CIM) comprising:
receiving a first file-type based rule with the rule being that if a new file has the name "TMP" then the new file will not be replicated to network storage;
receiving a second file-type based rule with the rule being that if a new file has a size less than one gigabyte then the file will not be compressed when it is replicated to network storage;
receiving a third file-type based rule with the rule being that if a new file has been opened and closed in less than one millisecond then caching to network storage is started;
receiving a first output file to be stored in a first storage location and replicated in network storage from a computing workload being performed by a cloud computing system;
determining that the first output file is named "TMP";
responsive to the determination that the first output file is named "TMP," applying the first file-type based rule to prevent replication to network storage;
receiving a second output file to be stored in the first storage location and stored in network storage from a computing workload being performed by a cloud computing system;
determining that the second output file has a size of less than one gigabyte;
responsive to the determination that the second output file has a size of less than one gigabyte, applying the second file-type based rule to prevent compression of the second output file when it is replicated to network storage;
receiving a third output file to be stored in a first storage location and stored in network storage from a computing workload being performed by a cloud computing system;
determining that the third output file has been closed in less than one millisecond;
responsive to the determination that the third output file has been closed in less than one millisecond, applying the third file-type based rule to start caching the third output file for replication to network storage.

* * * * *